(12) United States Patent
Hu et al.

(10) Patent No.: US 6,623,860 B2
(45) Date of Patent: Sep. 23, 2003

(54) MULTILEVEL FLOW STRUCTURES (75) Inventors: Xiaowen Hu, Santa Clara, CA (US); Mark Harwood, Los Angeles, CA (US); Travis D. Boone, San Mateo, CA (US); Hilary S. Lackritz, Cupertino, CA (US)

(73) Assignee: Aclara Biosciences, Inc., Mountain View, CA (US)

( * ) Notice: Subject to any disclaimer, the term of this patent is extended or adjusted under 35 U.S.C. 154(b) by 0 days.

(21) Appl. No.: 09/973,908

(22) Filed: Oct. 10, 2001

(65) Prior Publication Data

US 2002/0074271 A1 Jun. 20, 2002

Related U.S. Application Data (60) Provisional application No. 60/239,305, filed on Oct. 10, 2000.

(51) Int. Cl.[7] .................................................. B32B 7/00
(52) U.S. Cl. .................... 428/411.1; 137/833; 204/450; 204/600; 210/511; 366/341; 422/68.1; 422/100; 422/101
(58) Field of Search .......................... 210/97, 101, 321, 210/84, 511, 634; 422/100, 101, 129, 188, 191, 68.1, 99, 102; 204/450, 451, 600, 601; 366/336, 340, 341; 428/411.1, 446; 137/833

(56) References Cited

U.S. PATENT DOCUMENTS

| 5,126,022 | A |   | 6/1992  | Soane et al.   |         |
|-----------|---|---|---------|----------------|---------|
| 5,304,487 | A |   | 4/1994  | Wilding et al. |         |
| 5,389,196 | A |   | 2/1995  | Bloomstein et al. |     |
| 5,534,328 | A | * | 7/1996  | Ashmead et al. | 210/97  |
| 5,571,410 | A |   | 11/1996 | Swedberg et al.|         |
| 5,580,523 | A |   | 12/1996 | Bard           |         |
| 5,603,351 | A |   | 2/1997  | Cherukuri et al. |       |
| 5,639,423 | A |   | 6/1997  | Northrup et al.|         |
| 5,658,537 | A | * | 8/1997  | Dugan          | 422/191 |
| 5,750,015 | A |   | 5/1998  | Soane et al.   |         |
| 5,852,495 | A |   | 12/1998 | Parce          |         |
| 5,904,424 | A |   | 5/1999  | Schwesinger et al. |     |
| 5,985,119 | A | * | 11/1999 | Zanzucchi et al. | 204/450 |
| 5,989,835 | A |   | 11/1999 | Dunlay et al.  |         |
| 5,993,750 | A | * | 11/1999 | Ghosh et al.   | 422/191 |
| 6,103,199 | A |   | 8/2000  | Bjornson et al.|         |
| 6,153,076 | A |   | 11/2000 | Davidson et al.|         |
| 6,167,910 | B1|   | 1/2001  | Chow           |         |
| 6,309,602 | B1|   | 10/2001 | Ackley et al.  |         |
| 6,319,472 | B1|   | 11/2001 | Ackley et al.  |         |
| 6,392,007 | B1| * | 5/2002  | Buchanan et al.| 366/340 |
| 6,485,690 | B1|   | 11/2002 | Pfost et al.   |         |
| 6,494,230 | B2|   | 12/2002 | Chow           |         |
| 6,498,353 | B2|   | 12/2002 | Nagle et al.   |         |

FOREIGN PATENT DOCUMENTS

| WO | WO 96/04547 A1 | 2/1996  |
| WO | WO 97/02357 A1 | 1/1997  |
| WO | WO 99/56862 A1 | 11/1999 |
| WO | WO 01/89787 A2 | 11/2001 |

* cited by examiner

*Primary Examiner*—Joseph Drodge
(74) *Attorney, Agent, or Firm*—Jacqueline F. Mahoney; Peter J. Dehlinger; Perkins Coie LLP (57) ABSTRACT

Multilevel microfluidic structures and their use are provided for performing operations using electrokinetic or pneumatic force for moving sample components through and between levels. The devices have flow systems comprising microstructures including reservoirs, channels and vias, where each of the levels or lamina has a plurality of microstructures, and where the microstructures may communicate between levels.

8 Claims, 8 Drawing Sheets

MULTILEVEL FLOW STRUCTURES

This patent application claims priority to provisional patent application Ser. No. 60/239,305 filed on Oct. 10, 2000, which is incorporated in its entirety herein by reference.

FIELD OF THE INVENTION

The field of this invention relates to miniaturized flow systems, and in particular, to a microfluidics device composed of two or more layers or laminae, each containing a microfluidics structure.

BACKGROUND OF THE INVENTION

Microfluidic devices permit numerous operations with small volumes. Devices available today have two-dimensional flow systems, where all of the channels and microstructures are in the same plane. The microfluidic devices lend themselves to the movement of solutes and fluids by means of electric fields and pneumatics. The microfluidic devices allow for accurate control of dispensing volumes from one channel to the next. These structures have proven very versatile in performing numerous operations that had previously been performed on a macro scale. For example, DNA sequencing, high-throughput drug screening, chemistries, such as organic synthesis and diagnostics, have all found application.

While for many applications having a planar system is adequate, greater versatility of the microfluidic systems may be achieved with flow systems in three dimensions. By having channels and reservoirs in different planes, where the channels and/or reservoirs are interconnected, the number of solutions or solutes that can be mixed or fed to a receptacle, as well as the timing of such operations, is greatly expanded. Such a three-dimensional flow pattern would also permit a greater number of operations within a single microfluidic device having a small footprint.

The present-day devices are frequently prepared using molding techniques. By preparing a negative mold that can impress microstructures, such as trenches or channels and reservoirs, in a solid substrate, a flow pattern can be formed for performing various operations. The trenches and channels are operated enclosed, so a cover is bonded to the surface of the substrate, where openings for the reservoirs may have been formed in the substrate or are provided in the cover. The trenches or channels are usually quite small, having cross-sectional areas in the range of about 5 to 50,000 $\mu m^2$, frequently less than 10,000 $\mu m^2$. In carrying out the operations it is generally necessary that there be highly concentrated solute plugs that are manipulated. Variations in the shape or cross-section of the channels results in distortions in the plug and can affect the movement in the channel. When applying the cover, it is essential that there be little, if any, change in the shape of the channels, that the connections between channels be substantially unaffected and that the surface of the channels be unchanged. This requires great care in the manner of sealing and the materials used for sealing. The problems of sealing become exacerbated when dealing with multiple layers of fluid networks, where the channels in different planes connect to permit fluid flow from one plane to the next.

Also, there continues to be a demand for performing more assays or sample determinations in shorter periods of time. Microfluidic device technology has already demonstrated improvements over traditional bench-top methods such as faster electrophoretic separations and higher sample throughputs. Nonetheless, new structures or designs that improve the current level of operation of microfluidic devices are desired. Further, providing high-density devices in a smaller footprint permits a reduction in the size of fluid handling and detection devices that would interface with such devices.

BRIEF DESCRIPTION OF THE PRIOR ART

U.S. Pat. No. 5,904,424 describes a device for mixing small quantities of liquids. WO 99/56862 describes a micromachined mixer for microfluidic analytical systems.

SUMMARY OF THE INVENTION

The invention includes, in one aspect, a microfluidics device composed of first and second laminae, each having confronting inner surfaces at which the two laminae are bonded together, and opposite outer surfaces. A first channel microstructure includes a channel formed in the first lamina adjacent the first-lamina inner surface, and one or more reservoirs in fluid communication with the first-lamina channel. A second channel microstructure includes a channel formed in the second lamina adjacent the second-lamina inner surface. The first-lamina and second-lamina channels are enclosed by non-channel regions of the inner surfaces of the second and first laminae, respectively, and are in communication through one or more vias formed where a region of the first-lamina channel overlaps a region of the second-lamina channel. One or more openings formed in one or both laminae provide communication between the outer surface(s) of the lamina(e) and one or more reservoirs in the device. Liquid components contained in the first-lamina channel microstructure may be directed into the second-lamina channel microstructure through the via(s).

The second-lamina channel microstructure may also include one or more reservoirs communicating with the second-lamina channel. The one or more openings may communicate with the outer surface of at least one surface with reservoirs in both the first-lamina and second-lamina channel microstructures. The one or more reservoirs are adapted to receive an electrode in contact with liquid contained in the reservoirs, such that application of a voltage potential across selected electrodes is effective to move an electrolyte solution or charged components in a solution within the channel microstructures in each lamina and between the first-lamina and second-lamina microstructures.

In one embodiment, the first-lamina microstructure includes a sample-holding well and a sample channel in communication therewith, the second-lamina includes intersecting side and separation channels, and a sample-loading region in the separation channel where the two channels intersect. The sample channel in the first lamina has a region of overlap with the side channel in the second lamina, such that solution or solution components in the sample well can be moved into the sample-loading region through the via, and separation of charged sample components in the sample-loading zone can be achieved by applying a potential difference across reservoirs communicating with opposite ends of the separation channel.

In another embodiment, the first-lamina microstructure includes a first separation channel communicating at opposite ends thereof with first-separation channel reservoirs, the second-lamina microstructure includes a second separation channel communicating at opposite ends thereof with second-separation channel reservoirs, and (iii) the first and second separation channels communicate through a via which allows sample material separated by movement along the first separation channel to be loaded into the second separation channel, for further separation therein.

In particular, the second-lamina microstructure may includes a plurality of second separation channels, each communicating with one of a plurality of vias that communicate with the first separation channel at spaced intervals along the length thereof, allowing a plurality of sample components separated in the first separation channel to be further separated by movement along each of the plurality of second separation channels.

In still another embodiment, the first-lamina microstructure includes a first separation channel communicating at opposite ends thereof with first-separation channel reservoirs, and the second-lamina microstructure includes a plurality of sample-processing stations at which sample-processing steps can occur. Each station communicates with one of a plurality of vias that communicate with the first separation channel at spaced intervals along the length thereof, allowing a plurality of sample components separated in the first separation channel to be further processed by movement into a selected processing station.

These and other objects and features of the invention will become more fully apparent when the following detailed description of the invention is read in conjunction with the accompanying drawings.

DESCRIPTION OF THE SPECIFIC EMBODIMENTS

Multilevel microfluidic devices are provided comprising two substrates or laminae, each having channel microstructures formed therein, and communicating across a lamina interface. Also provided are multilevel microfluidic devices wherein at least one lamina has a sheet comprising vias that permit flow between different planes. The microfluidic devices comprise microstructures that include channels, vias and reservoirs, where the channels, for the most part, lie in a plane of a substrate, while the reservoirs may be in a substrate or extend through a plurality of laminae or be in one lamina and connected to another microstructure in a different lamina through a via.

In referring to substrates, sheets and laminae, a substrate will usually have a plurality of microstructures present in the substrate, a sheet can serve to seal substrates or to join substrates and other sheets together, and will for the most part be structural layers that do not involve microstructures other than vias and serve to adhere substrates together, insulate one substrate from another or provide other functions, such as providing electrical circuitry, and a lamina will generally comprise substrates as well as intervening sheets.

Various flow patterns can be devised for the flow systems, with the flow patterns in each lamina and in some instances the vias between them providing the flow system or circuit. The devices can be used for the movement of fluid or fluid components in different levels and/or between the levels for carrying out operations involving the movement of such fluids, components, buffers, reagents, etc. of an operation in a prescribed manner, for performing additions of liquids or solutes, mixing of solutions and solutes, separations, sampling of solutions and the like.

The devices will generally have a planar dimension in the x-y plane in the range of about 50 mm$^2$ to about 250 cm$^2$, where the size will depend on the size of the individual laminae, fluid transfer systems, both to and from the device, where such systems are integrated with the device, the nature of the structures for manipulating the device and their requirements, such as robotic handling, receptacles for receiving the device and the like. For the most part, the size of the device will be controlled by the size of the individual lamina. The top and bottom of the device will usually be planar, but in some situations one or both surfaces may be uneven, having extensions for fitting into holders, fittings for receiving conduits, conduits extending from channels or vias, attached receptacles, lenses, and the like. Also, the internal surfaces of the lamina will be planar, except in situations where structural features are present, such as interlocking connectors, alignment features, conductive layers bonded to the lamina, etc. The thickness of the device comprising solely the laminae will generally be in the range of about 1 mm to 10 cm, more usually at least about 2.5 mm and not more than about 5 cm, where the thickness will depend on the number and thickness of the individual layers, while the additional structures on the surface may increase the overall size of the device. The shape or circumference of the device may be rectangular, circular, hemispheric or other arced shape, an uneven shape or the like, depending on the nature of the other devices with which the subject device interacts. The device may have connectors or fittings for connecting to other devices, conduits and the like, indents for locking to other devices, enlarged channels for receiving conduits, an index for orienting the device to other devices, etc.

The number of inlets, channels and outlets will vary with the presence or absence of vias. There will usually be at least one inlet and at least three outlets, generally at least about 2 inlets and 5 outlets, although depending on the nature of the flow system there may be at least 5 inlets and 2 outlets. The number of inlets may be 10 or more, even 30 or 400 or more, and the number of outlets may be 10 or more, and may be 100 or more, the ratio varying depending on the nature of the flow circuit, generally having a ratio of inlets to outlets in the range of about 1:10–10:1. By an inlet it is intended connections to the microstructures by which material is introduced into the device. Conversely, by outlets it is intended connections to the microstructures by which material exits the device. Where there are vias, there will usually be at least 2 vias, more usually at least 5 vias, providing connections among channels and reservoirs in different levels.

The reservoirs may be solely in one substrate or extend through more than one substrate or combination of substrates and sheets. Reservoirs may be formed with side and bottom surfaces being of the same substrate or of different substrates or sheets. Reservoirs may be connected to a microstructure through a via. For the purpose of this invention, the via need have no length, where the reservoir bottom connects directly to a microstructure, such as a channel. In this case the common area between the bottom of the reservoir and the top of the channel would be the area of liquid communication. Usually, however, the reservoir would have a bottom surface with an orifice, termed a via, to limit the common area between the reservoir and a channel.

The channels that are formed in substrates may face toward each other when the substrates are joined, face in opposite directions, or face towards the same direction. When channels are formed by molding, embossing, or etching, for example, the channels will be formed as open channels and will be closed by sealing against the channel-containing surface a sheet, a film, or another substrate, directly or by an interleaf which serves to bind the substrates together. In the absence of an interleaf, there would be communication between the channels wherever a channel in one lamina crossed a channel in the other lamina in cases where the channels are confronting. In such a case where two channels in different confronting substrates cross, the plane of fluid communication between the channels may be described as a via of zero length. Where the channels are not confronting, then one substrate can serve to seal the channels of the other substrate and a separate sheet, film or enclosure can be used to seal the channels in the other substrate. Where there are more than two layers, the same principles would apply.

The subject devices may be used for performing numerous operations where complex combinations and process steps may be involved. In this way, one may move components in complex patterns, perform chemical reactions, perform separations, provide for interaction of products and analyze the results, for one or a plurality of procedures in a single device. In addition, the subject devices may be linked to numerous other devices for delivering fluids to the other devices in a controlled manner, providing for the delivery of specific micro-volumes in accordance with a predetermined regimen. The subject devices may have means for controlling movement of fluids in the device such as by a data processor, so that a program can be designed whereby the operation is under the control of the data processor. In this way components of a solution may be moved internally in the device in accordance with a predetermined program, independently or in combination with other devices to carry out various processes.

Illustrative combinations with the subject device are with microtiter plates, which may have 96, 384 or a higher multiple of wells. The subject devices may serve to retrieve fluids from the microtiter plates, process the materials and then transfer the processed materials to the same or another microtiter plate. The subject devices may be used with cellular arrays as described in U.S. Pat. No. 5,989,835, where fluids may be dispensed into individual cell-containing micro-compartments, permitting different entities to be dispensed in each of the compartments, as well as the dispensing of common solutions, such as buffer. The device can be connected to manifolds, where the solutions introduced into the device may be varied at different inlets and times, interfacing with robotic systems, where the device supplies the different solutions. The devices can be used to receive different samples, such as different candidate compounds, distribute each of the compounds to the same or different reagents, incubate the solutions to allow for the candidate compounds to have an effect on the reagents, and then analyze the effect of the compounds on the reagents. For example, one may wish to evaluate a plurality of candidate drugs, potentially toxic agents, naturally occurring compounds, samples from the same or different sources that may have been subjected to different conditions, effluent streams, environmental media, such as air, water and soil, perform proteomics, genomics, and immunomics, or the like. Each of the candidate compounds would be introduced into an inlet, where the inlet would feed to a manifold having a plurality of channels, for example, at least 3. The channels would then be connected through vias to channels at a different level, where reagents would be introduced into the candidate compound channel and the mixture allowed to incubate. After sufficient time for the candidate compound to influence the course of any change in the reagents, the mixture could be moved and subjected to analysis. As an example of such a system, the candidate compounds could be drugs being screened for their effect on a plurality of related or unrelated enzymes. Other situations would involve distributing a sample to be analyzed to a plurality of microstructures, combining the aliquots in the different microstructures with different reagents and then analyzing the mixture using, for example, labeling and separation by capillary electrophoresis.

Each of the lamina will have at least one fluid flow circuit that comprises at least four channels, sometimes six or more channels, and on occasion eight or more channels, where a channel is counted as being a length of channel between reservoirs and/or channels. For example, where ostensibly two channels cross, there would be counted four channels connecting at an intersection. The channels may have many designs, such as manifolds, where a single or plurality of channels feed into a manifold or successive manifolds, where a manifold intends to two or more channels; or a common channel that has a plurality of ports or outlets for distributing components among the ports and receiving agents, particularly reagents, with which the components in the channel interact. Each lamina may have one or more manifolds with their feeder lines or channels, where the flow circuit in the different lamina at the different levels may be the same or different. One may provide for reservoirs at different levels where different solutes may be introduced at the same or different sites along a channel at one of the levels. A single or plurality of reservoirs may connect with channels in the same level and/or different levels, which permits great versatility in the solutes that may be added at different places along the length of a channel, the opportunity to mix solutes, to add samples, etc.

Each of the lamina may include a single or plurality of independent flow circuits or circuits that may share a channel or a reservoir, but are intended to act on individual samples or provide individual streams to a receptacle. In this way, efficient use of space is achieved as the footprint for the device can be confined to a small area, generally less than about 200 cm², generally less than about 100 cm² and frequently less than about 75 cm², while allowing for a large number of operations, distribution of fluids and solutes to a plurality of sites and variation in the components delivered to a plurality of sites. Generally, the longer dimension for the device, excluding other devices that may be integrated with the flow circuits, will not be greater than about 20 cm, usually not more than about 10 cm, and may be 5 cm or less, while the shorter dimension will generally be at least about 5 mm, usually at least about 1 cm.

The multilevel microfluidic devices can employ any convenient method of inducing component, including fluid, movement, desirably controlled component movement, where the volumes and/or amounts of a component can be accurately defined for transport and delivery. Methods for initiating transfer of components include electrokinetic, e.g. electrophoresis and electroosmosis, pneumatics, e.g., pumps, hydraulics, e.g. hydraulic heads, pistons, etc., and the like. The particular method employed will depend on the nature of the operation, the complexity of the flow system, the nature of the components, etc. The use of electrodes for electrokinesis and the nature of the walls for enhancing electroosmosis or electrophoresis are well known.

As indicated, the primary microstructures of the device will be channels, vias and reservoirs. The channels are defined within a single level though often may be in connection with microstructures in different laminae. Reservoirs may extend beyond a single lamina to connect with a plurality of flow circuits or flow circuits in levels more distant from the upper surface, or be connected to other microstructures in other planes through vias. In this way flow circuits at different levels may be connected through a common reservoir, so that the reservoir may serve as a common source of a component, a source of electrical field, of pressure, or the like. Vias, as noted above may have no length. More typically vias are through-holes that are provided in substrates, sheets or bonding layers that provide fluid communication between other microstructures in different laminae.

The channels will generally be of capillary dimension, of a cross-sectional area of not more than about 1 mm², usually less than about 0.75 mm², more frequently less than about 0.1 mm², and frequently as small as about 50 μm² or in some situations, may even be less. The cross-section may be circular or non-circular, e.g. rectangular, trapezoidal, triangular, etc. For non-circular cross-sections the channels will generally have an average depth of about 5 μm to 1 mm, preferably in the range of about 5 to 50 μm, more usually 10 to 30 μm, and an average width in the range of about 10 μm to 2 mm, more usually 25 to 500 μm. Selection of the size of the channel will depend on the reaction volume desired, the nature of the operation, the nature of the flow circuit, and the like.

The vias are passageways that extend between two different levels and may connect reservoirs and channels, as appropriate. The vias, for the most part, will interconnect two channels in different levels, although there may be instances when one via may feed into a plurality of channels and/or reservoirs, so as to overlap each of the microstructures in whole or in part, where the via would be substantially larger than a channel to accommodate the plurality of microstructures. Also, as discussed above, direct connection between levels may be achieved between the microstructures, as overlapping or crossing channels or one or more channel and a reservoir, etc.

The reservoirs will generally have a volume capacity in the range of about 100 nl to 5 ml, generally from about 0.1 μl to 1 ml, more usually from about 1 μl to 100 μl. Their depth will generally be in the range of about 5 μm to 2 mm, more usually from about 10 μm to 1 mm, with diameters in the range of about 0.1 to 5 mm, usually 0.2 to 3 mm. The reservoirs will normally be open to the atmosphere and serve as sites of entry to the device, along with connectors to other sources. It may be desirable to attach a fixture to the surface that extends the height of the reservoirs where more fluid capacity is needed, to reduce the effect of evaporation, to facilitate liquid transfers, etc.

The multilevel device will usually be a monolithic device comprised of a plurality of individual lamina, comprising substrate layers that are bonded together. Depending on the purpose of the lamina, the lamina may be a film of a thickness of at least about 1 mil, usually at least about 5 mil or a solid flexible or inflexible plate or card of a thickness of not more than about 5 mm, usually not more than about 2 mm and preferably not more than about 1 mm. These substrates will have the microstructures embedded therein.

The substrate in which the channels are formed may be of any convenient material, such as glass, plastic, silicon, or the like. Various plastic or organic polymeric materials include addition and condensation polymers and copolymers, linear or cross-linked, clear, translucent, or opaque, mixtures of polymers, laminates and combinations thereof. Polymeric materials include polyethylene, polypropylene, acrylics, e.g. poly(methyl methacrylate), polycarbonate, poly(vinyl ethers), polyurethanes, dimethyl siloxanes, poly(4-methylpent-1-ene), poly(norbornene) homo- and copolymers and their derivatives, etc. Of particular interest are the acrylic polymers and poly(norbornene) polymers, particularly the same type of polymer being used for the lamina of the device. Desirably the polymers should be capable of extrusion or molding.

Of particular interest are polymers that are produced using norbornene-based monomer molecules polymerized through a ring opening metathesis polymerization (ROMP) followed by hydrogenation. The polymers are substantially completely hydrocarbon, will generally have less than about 5% unsaturation (based on the number of double bonds present prior to hydrogenation), and have heat resistance, having a $T_g$ of greater than about 60° C., usually greater than about 90° C. Co-monomers include substituted norbornenes, particularly alkyl-substituted norbornenes, and polycyclic olefins and alpha-olefins of from about 2 to 10 carbon atoms, etc. Also of interest are acrylics, such as poly(methyl methacrylate).

Electronic circuitry can be formed on external or internal surfaces, either substrates, sheets, bonding layers or interleafed lamina. In this way, electrodes can be provided to sites that are substantially enclosed, e.g. reservoirs that are connected to two channels, so as to be filled through one of the channels. The internal reservoir may serve to protect components from air, minimize evaporation from the reservoir, prevent contamination during operation, etc. The electronic circuitry can be formed with conducting inks, lithographically defined using semiconductor fabrication methods, deposited metal thin films, etc. The external electrical circuitry provides a convenient way to provide electrodes at the different microstructures.

The multilevel microfluidic devices are produced by introducing microstructure patterns into at least two plastic substrates or laminae. The patterns may be formed in the layers by molding, etching, embossing, etc., as described in the literature. The substrates may have the microstructures, particularly the channels positioned in the substrates, so as to be confronting, facing in opposite directions or facing in the same direction. In any one device, any or all orientations may be present. Where the channels are confronting, overlapping channels can serve for communication between the substrates, or an interleaved lamina, particularly a film, may be introduced to enclose the channels in the two laminae, where communication will be provided by vias in the interleaved lamina.

A sandwich is assembled of the microstructure-containing plastic substrates and any additional lamina for enclosing channels, reservoirs, providing passageways or openings, etc. to form the overall composite flow system. The laminae are bonded to provide for leak proof seals in the areas between the channels and reservoirs, so that contamination between microstructures is prevented. One may use plastic layers having different glass transition temperatures or use intermediate films of plastic layers having lower glass transition temperatures than the functional layers. Of particular interest is a sandwich of functional layers in which microstructures are formed interspersed with thinner layers of a chemically similar material having a lower glass transition temperature, which thinner layer is able to form a sealing bond between the two surrounding functional layers, when the sandwich is heated to above its glass transition temperature under compression. For example, norbornene homo- and copolymers are available as commercial products in a variety of glass transition temperatures, but having otherwise analogous physical properties. Alternatively, one may use curable adhesives, where the bonding surface of a substrate is coated with the adhesive. Curing can be achieved in one or two steps, where curing occurs while the sandwich is maintained under pressure or the adhesive is partially cured before assembling the sandwich and the curing completed after assembling the lamina and applying an appropriate pressure to the sandwich. Various techniques can be used for orienting the laminas to each other, such as indexes, markers that are optically monitored, alignment features, and the like.

Depending on the number of layers, the glass transition temperatures of the individual layers, the thickness of the layers as well as their cross-section, their heat transmission properties, etc., different temperatures and pressures may be employed to provide the sealing between the layers. Conveniently, a pressure fixture is employed, where the pressure applied is in the range of about 2 to 10 tons, at external temperatures in the range of about 125 to 300° C., where the internal temperature will be at least 5° C., usually at least about 10° C. above the glass transition temperature of the bonding layer and at least 10° C., usually at least about 15° C. below the glass transition temperature of the substrate or functional lamina. The time will generally vary in the range of about 10 s to 10 min. Other techniques for bonding may also be used, such as hot melt adhesives and two stage bonding as described in PCT Application No. WO 98/45693, which is herein incorporated by reference. Alternatively, one may use a multiplicity of functional films in which the microstructures are formed and bonded together under heat and pressure, adhesives applied to the surfaces to be bonded and the films pressed together or bonding films interleaved between these functional films. The films are continuously supplied from an extruder, rolls or other source of a film, providing at least about 20, more usually at least about 50 devices in a single run. The films may be extruded and the microstructures impressed in the functional films, followed by apposing the films and compressing the films to form the device. Rolls of films may be employed, where the functional films may be prepared prior to being taken up on a roll or the microstructures introduced after being taken up on a roll. See, for example, PCT Application Nos. WO 99/19717 and 99/15876, which are herein incorporated by reference. Where a continuous source of the laminas is used, the resulting devices may be retained as a roll, conveniently being scored between devices or may be separated by any convenient means, such as laser cutting, blade, hot wire, etc. While the channels will generally be formed in the substrates, other microstructures such as vias or reservoirs may be introduced by drilling.

In using the devices, one may use reservoirs or inlet ports as access to the device and its microstructures. Where inlet ports are employed, the port may be beveled to minimize the dead volume, where the feeding conduit will be beveled to match the inlet. For reservoirs one will usually use transfer devices, such as syringes, capillaries, slotted pins, ink-jet dispensers, and the like. As indicated previously, the capacities of the microstructures will be low, so that volumes being transferred will normally be less than about 5 ml, frequently less than about 1 ml, usually less than about 5 $\mu$l, more usually less than about 2 $\mu$l and generally in excess of 10 nl, frequently in excess of 50 nl. The problem is more one of efficient transfer, than any minimum volume that may be accommodated by the device. However, there may be cases where the thickness of the devices limits the capacity of the reservoirs and the necessary capacity can be obtained by adding fixtures to the planar substrate.

Usually buffer will be present, which can be provided in a common reservoir for all of the flow systems or associated with one or more flow systems, but fewer than the total number of flow systems present in the device. The number of reservoirs will be a matter of design and ease of distribution. Also sample reservoirs or inlets will be present, where usually there will be a single sample, which may be a single or multicomponent sample, for each flow system. In addition, there may be inlets and/or reservoirs for other reagents, where there may be a single or plurality of sources for the reagents to be distributed to one or more flow systems. In other layouts, flow systems may accommodate a plurality of samples wherein the samples are separately processed within distinct regions of microstructures but other reagents, buffers, waste fluids, etc. are processed in common channel manifolds or reservoirs.

Illustrative of the use of the system is a process indicated above, namely screening a plurality of candidate compounds for their activity on a plurality of enzymes, each enzyme having a distinguishable (enzyme) substrate and product. For ease of discussion only one flow system will be described. In a main channel lamina is an enclosed main channel having a buffer reservoir and a waste reservoir at respective ends open to the atmosphere through other lamina. In an upper lamina above the main channel lamina are three reservoirs, one for candidate compound, one for enzyme and one for substrate. The reservoirs are connected to the main channel through short secondary channels in the upper lamina and main channel lamina and vias between the laminae. A bed of nails is used for a plurality of electrodes that are connected to a circuit to control the voltage applied at each reservoir. The main channel and associated reservoirs are filled with buffer. The candidate compound is introduced into the main channel by activating the electrodes in the candidate compound reservoir and the buffer reservoirs, selecting voltages to direct the candidate compound down the main channel where the other secondary channels intersect with the main channel. After directing the candidate down the main channel toward the waste reservoir, the voltages are changed to direct the enzyme into the main channel to mix with the candidate compound. After allowing the compound and enzyme to incubate, the voltages may be changed a third time and the substrate introduced into the main channel to mix with the enzyme-candidate compound mixture and the mixture incubated for sufficient time for a detectable amount of product to be formed in the absence of any effect of the compound. The reaction may then be terminated by heating the mixture, introducing a 'stop' reagent, irradiating infrared light or other means. The enzyme reaction may then be analyzed by concentrating the product in the main channel by applying an appropriate voltage and electrophoresing the mixture to provide a concentrated band of the enzyme product and then injecting the band of the product into an analysis channel for further concentration and detection of the product band. One may provide for two channels side-by-side, where the candidate compound is absent in one of the channels, so that one would operate the two flow systems substantially the same except for the absence of the candidate compound in one flow system and directly compare the results in the two channels. Obviously, the candidate compound reservoir can be connected to a plurality of flow systems at different levels by means of vias extending through two or more laminas and connecting to two or more secondary channels. Similarly, the other reservoirs may be used as a source for enzyme and substrate for a plurality of flow systems.

Also exemplary is the use of the devices to provide a multiplicity of components to a receptacle in accordance with a predetermined regimen. The device would have a plurality of levels with each level having a manifold having a common component source feeding the manifold and a plurality of outlets in the manifold for distribution of the component into the plurality of receptacles. Upstream from the reservoir having the component would be a common buffer reservoir connected to the channel connecting the component reservoir to the manifold. By providing electrodes in the two reservoirs, the component is moved using electrokinesis from the reservoir into the manifold-connecting channel and into the channel connected to the buffer reservoir. By employing electroosmosis in the channel connected to the buffer reservoir, fluid will flow through the manifold and into the receptacles. For example, one could have vias that would direct the flow downward to the receptacle. To provide for the electroosmotic flow, a waste reservoir may be connected to the channels fed by the manifold, where the connection to the waste reservoir inhibits flow to the waste reservoir, e.g. having a small cross-section as compared to the feeding channel, connected by a salt bridge, etc. In this way, each component may be fed concurrently, consecutively or by any particular regimen to the plurality of receptacles in a controlled manner, both as to time and volume, using a predetermined program. For example, if one wished to determine the effect of a common agent on a plurality of different cells, each receptacle would have different cells. One would then add the common reagent simultaneously to each of the receptacles, incubate the mixture and then add additional reagents to provide a detectable result. In this manner, each of the receptacles receives the same amount of reagent at the same time to provide for a more accurate outcome. Furthermore, where the plurality of receptacles are provided as a row and column array the use of multilevel flow systems permits independent access of each row and/or column of receptacles, and therefore multivariant agent testing on the plurality of cells.

Also exemplary of the subject invention is the use of devices for two-dimensional separation analyses of biological samples, or for one-dimensional separation followed by processing in the second level of individual separated components.

In the first embodiment, sample separation occurs on one level (in one lamina) followed by transfer of separated fractions from the first level to a second level or lamina. In the second level a second dimension separation process is performed on each separated fraction to complete the 2D separation analysis. Particularly, this process is applicable to the 2D electrophoresis of protein samples. A main separation channel has reservoirs at both ends and a series of side channels intersecting the main channel at regular intervals. The intersecting side channels emanate from a common reservoir, cross the main channel and lead through vias to a second level in the device. In the second level, the vias connect with a channel that leads to an electrophoretic injection cross and a secondary separation channel. The usual microstructures required for electrophoretic analysis are present, such as reservoirs for the buffer, injection waste and separation waste, and means for optical detection. Any of the reservoirs may be part of a manifold to reduce the complexity of the microstructures. The main channel is filled with a separation medium appropriate for isoelectric focusing. The cross channels provide both the means to exchange the buffer in the main channel with an SDS buffer after the isoelectric focusing separation is complete, as well as a means to transfer fractions to the secondary separation element. The secondary separation channel is filled with medium appropriate for gel electrophoresis to effect separation based on electrophoretic mobility.

In the second embodiment, separated sample components in one lamina are transferred, through each of a plurality of vias, to one of a plurality of individual processing stations in the second lamina. The processing station may be designed, for example, to carry out PCR amplification of separated nucleic acid fragments, or to perform enzymatic or other chemical modifications of separated components.

Figure 1A:
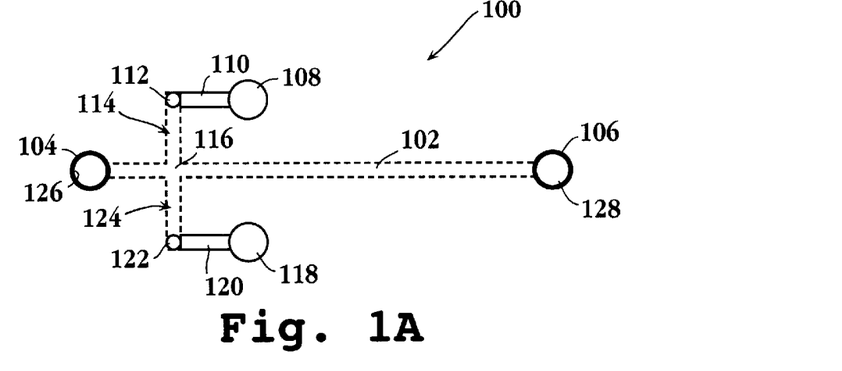
FIG. 1A is a diagrammatic view of an embodiment of this invention wherein the levels are distinguished by solid and broken lines.
Figure 1B:
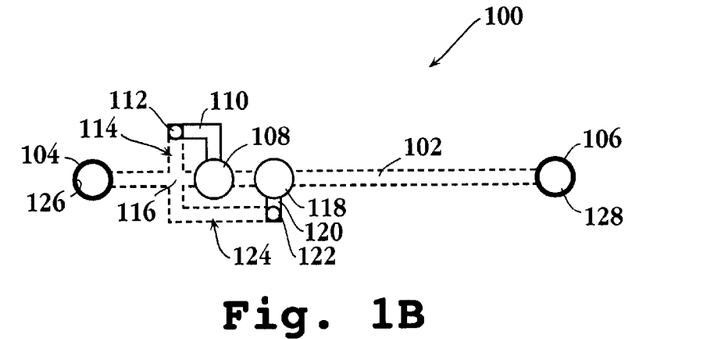
FIG. 1B is a diagrammatic view of another embodiment of this invention.
Figure 1C:
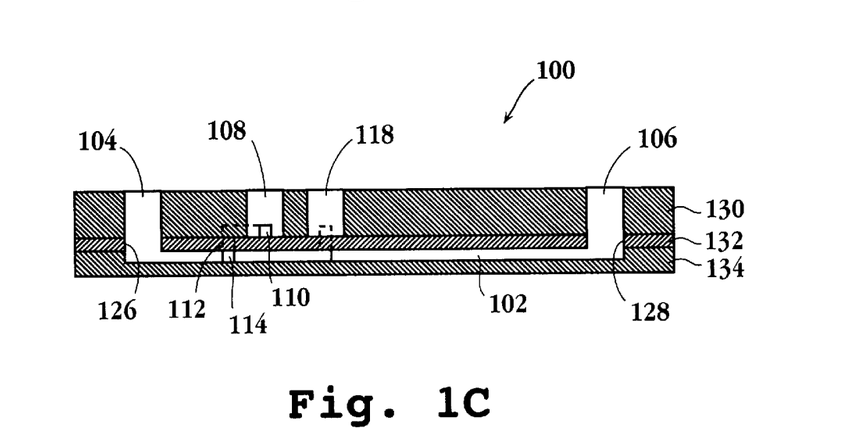
FIG. 1C is a cross-sectional view of the embodiment depicted in FIG. 1B.

For further understanding of the invention, the drawings will now be considered. In FIG. 1 is shown views of two flow systems according to this invention. In FIGS. 1A and 1B, channels in an upper layer are drawn with solid lines and channels in a lower layer are drawn with dashed lines. In FIG. 1A is shown a top view, with the flow system 100 having a main channel 102 connecting buffer reservoir 104 to waste reservoir 106. A sample reservoir 108 is connected by upper secondary channel 110 through via 112 and lower secondary channel 114 to intersection 116. Similarly on the other side of the main channel 102, sample waste reservoir 118 is connected by upper secondary channel 120 through via 122 and lower secondary channel 124 to intersection 116. In FIG. 1B the microstructures have been moved to provide a smaller footprint for the flow system, but the parts are still the same, where the reservoirs 108 and 118 are positioned over the main channel 102, so as to minimize the area of the device occupied by the flow system. By providing for a compact flow system with short secondary channels, a greater number of flow systems may be provided in a single device. In FIG. 1C a cross-section is shown of the device of FIG. 1B. In FIG. 1C three lamina are shown, the upper layer 130 in which the reservoirs 108 and 118 and the secondary channels 110 and 120 are formed, a bonding layer 132 through which vias 112, 122, 126 and 128 are formed and a lower layer 134 into which the reservoirs 104 and 106 extend and main channel 102 and the secondary channels 114 and 124 are formed. Components moved from intersection 116 toward waste reservoir 106 by, for example, electrophoresis, may be detected at a location upstream from the waste reservoir 106 using optical means through the top of the device by having a transparent site in upper layer 130 and bonding layer 132 at the detection site or by having entirely transparent upper and bonding layers. Alternatively, optical detection can be performed through the bottom of device 100 by having a transparent site at the detection site in lower level 134 or by having an entirely transparent lower layer. The upper, middle and lower layers need only be transparent with respect to the wavelengths employed in the optical detection process. The vias may be formed by punching holes in the bonding layer to be in registration with the microstructures in the upper layer 130 and the lower layer 134.

FIG. 2 shows the composite multilevel device and the separate level patterns for a card designed to provide four CE injection/separation elements that have a common separation waste well formed through the vias between the two microfluidic levels. The device of FIG. 2 was prepared as follows: a 1.5 mm thick Zeonor® (Z1420R) planar card layer with through holes and channels face down was laminated to a 100 µm Zeonor (Z1020R) film with vias by preparing a sandwich of a polyester protection film, the card layer, the via-containing film, a polyester protection film and a metal shim. The resulting 2-layer composite was then used to prepare a sandwich having a polyester protective film, the 2-layer composite prepared above, a 0.6 mm Zeonor (Z1420R) planar card layer with channel face up, a polyester protective film and a metal shim. The channels were 30 µm deep and 80 µm wide, the well size was 1 or 1.5 mm diameter and the via was 1.5 mm diameter.

Figure 2A:
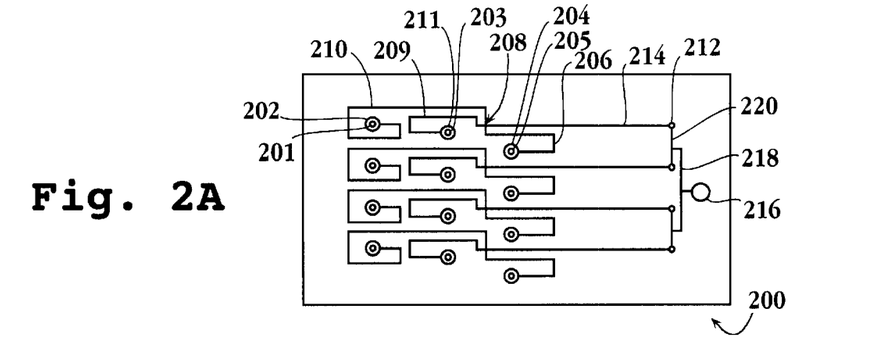
FIG. 2A is a composite diagrammatic plan view of the flow circuit of a multilevel device according to the subject invention.
Figure 2B:
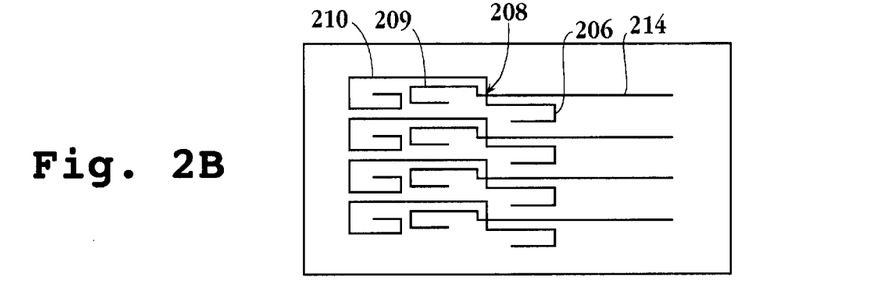
FIGS. 2B, 2C, 2D are diagrammatic plan views of the microstructures of the lower, middle and upper levels, respectively, of the device of FIG. 2A.
Figure 2C:
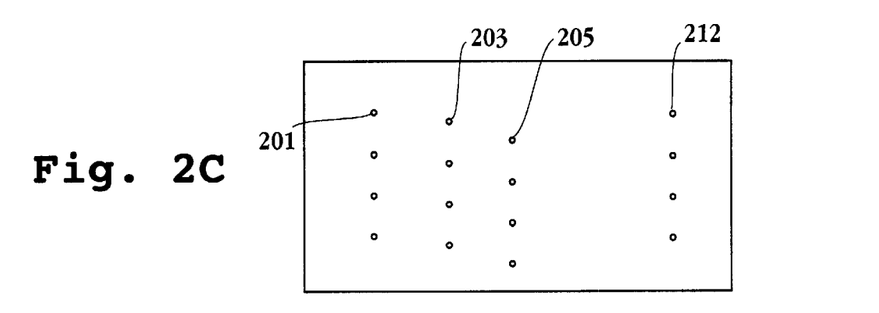
Figure 2D:
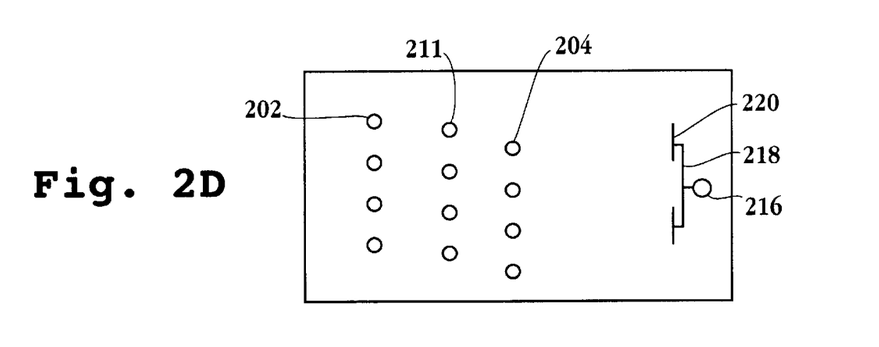

Turning to FIG. 2A, the composite design is shown, while FIGS. 2B, 2C and 2D show diagrams of the lower, middle and upper levels, respectively. The wells are shown as larger circles, the vias as smaller circles and the channels as lines, where a bold, black line indicates a channel in the upper level and gray line indicates a channel in the lower level. The device has a sample injection and separation system on one level and the common main channel waste reservoir on the other level.

The device 200 has four flow elements but only one flow element will be described, the other three having the same organization while being offset at different sites in the device. Sample well 204 is connected through via 205 and channel 206 to injection intersection 208 and through channel 210 and via 201 to sample waste well 202. Buffer well 211 is connected to injection intersection 208 through via 203 and channel 209. Injection intersection 208 is connected to channel 214, which connects through via 212 to the waste manifold. Separation waste well 216 is connected through first manifold channel 218 to secondary manifold channel 220, which connects through the vias 212 to channel 214.

In operation of the device, buffer would be introduced throughout the device to fill all of the channels and wells, although the sample well may be only partially filled or empty. Sample would then be introduced into sample well 204 and electrodes inserted into the liquid in wells 202, 204, 211 and 216. By appropriate choice of voltages at the wells, sample is moved from sample well 204 through injection intersection 208. Once the sample has been moved through the injection intersection 208, the voltages are changed and the sample at the intersection injected into channel 214. The sample may be separated and analyzed in channel 214. If one wished, one could provide that the sample or fractions thereof from the earlier separation could be further processed in channels in the lower level by changing the voltages in the reservoirs.

The above-indicated device was used for the injection and separation of fluorescein to demonstrate its capability. The system was filled with 25 mM HEPES, 1% PEO buffer. To the sample well was added 5 µl of 0.5 mM fluorescein in 25 mM HEPES buffer. A voltage of 1000 V was applied at the sample well 202, while the other 3 wells were held at ground. The voltage was maintained for 45 s to allow the injected plug of fluorescein to pass the intersection. The voltage at the wells was then changed to ground at buffer well 211, 700 V at sample well 204 and sample waste well 202 and 1400 V at waste well 216, and maintained for 30 s to cause the electrophoretic separation. The fluorescein band was detected 5 mm from the intersection.

The same device design and fabrication procedure described above was used for an acrylic plastic, using a 1.5 mm V825 upper layer bonded to a 0.6 mm thick lower layer of V825, with an intermediate bonding layer of Rohm MT40 film.

Following the procedure described above, the injection and separation of a sample of 1 µM fluorescein was performed. Injection was performed by applying 0,900,0 and 0 V to wells 211, 202, 216 and 204, respectively, for 45 s, while separation was performed by applying 0,800,1400 and 800 V for 30 s and detection occurred at about 1.5 cm downstream from the intersection. The fluorescein electrophoresed down the separation channel and a well-defined peak with the appropriate peak shape was detected.

Figure 3:
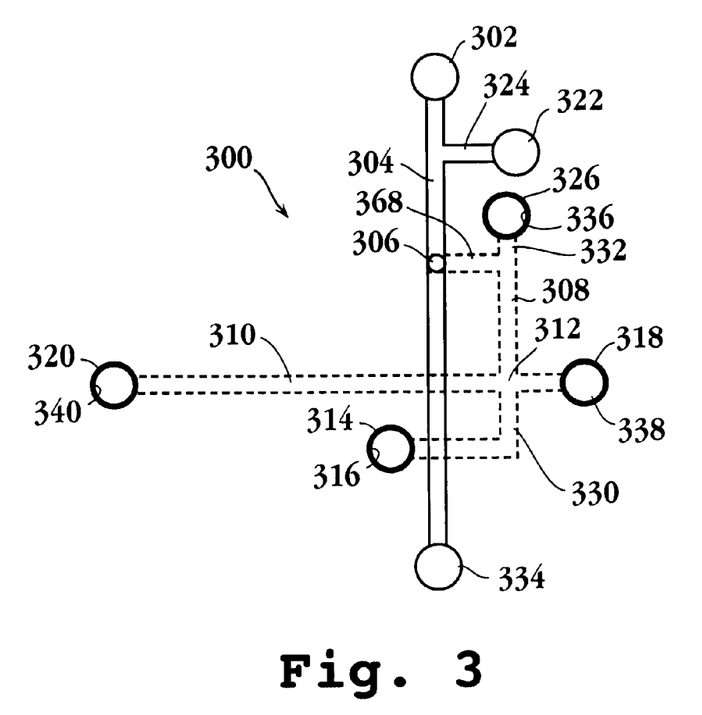
FIG. 3 is a diagrammatic plan view of a multilevel flow circuit according to this invention used for mixing, dilution and separation.

The next device, depicted diagrammatically in FIG. 3, is a two level device for sample stream dilution, mixing and electrophoretic separation and detection. The device 300 has sample well 302 feeding into sample/injection channel 304 present in the upper level. For dilution of the sample, sample diluter well 322 is provided, connected to sample/injection channel 304 by connecting side channel 324. The sample/injection channel 304 is connected by via 306 to lower channel 328, which is part of the separation system. For mixing of a reagent with the sample, reagent well 326 is provided, connecting through lower channel 332 to lower channel 328 and lower channel 308. Lower channel 308 connects to assay channel 310 at intersection 312. Injection waste well 314 in the upper level connects through via 316 to channel 330, which also connects to separation channel 310 at intersection 312. The separation channel 310 connects through vias 338 and 340 to separation buffer well 318 and separation waste well 320, respectively. While the intersection 312 is shown as a cross intersection, the intersection could instead be a double-T intersection with channels 308 and 330 connecting to channel 310 at offset positions. In fact, the lower level has no well independent of the upper level. Rather each of the electrical connections in the lower level are through a well in the upper level and a via to the lower channel. In this way one may use a single fixture having a plurality of properly positioned electrodes, namely a "bed of nails" to provide the electrical fields for the various operations of the system.

In operation, electrodes are variously introduced into wells 302, 314, 318, 320, 322 and 326. Initially a voltage drop is provided between wells 302, 322 and well 314, where the voltages at wells 302 and 322 may be set differently to provide the appropriate level of dilution. In addition, for mixing into the sample a reagent from reagent well 326 a voltage drop is also provided between well 326 and well 314. Conveniently, for the analysis of negatively charged sample components, a positive voltage may be set at well 314 and well 302 and 322 may be grounded. The degree of dilution will in practice be determined by the relative mobility of the components of wells 302 and 322 as well as the relative voltage drops imposed on the wells. The sample will move into sample/injection channel 304 and be diluted by diluent coming from well 322 and side channel 324 by an appropriate proportion. The diluted sample will move through via 306 into lower channel 328 and, where a reagent is to be mixed in from well 326, mix with the reagent as the two streams enter channel 308 and then move through intersection 312. The degree of mixing will again be determined by the relative mobility of the components as well as the relative voltage differences imposed on the wells.

At this time, the voltage at wells 302, 322, 326 and 314 may be set at the same voltage, a voltage above 0, the voltage at well 320 set at a positive voltage and the voltage at well 318 set at ground. The sample at intersection 312 will then be injected into the assay channel 310 toward waste well 320 and may be separated and detected at a detection site, not shown.

The device of FIG. 3 was made using the acrylic material as described above for the device of FIG. 2. The bottom level channels were 30 $\mu$m deep and 75 $\mu$m wide, while the top-level channels were 50 $\mu$m deep and 125 $\mu$m wide. The wells were 2 mm diameter, while the vias were 1 mm diameter. The device was operated by loading 3 $\mu$l of 1% PEO in 25 mM HEPES into all the wells, except the sample well. Buffer was removed from the sample well by vacuum and 1 $\mu$M fluorescein or 100 $\mu$M fluorescein in 1% PEO and 25 mM HEPES was placed in the well. For injection, the voltages were 0, 900, 0 and 0 V in wells 318, 314, 320 and 302, respectively, while for separation, the voltages were 0, 700, 1200 and 700 V and maintained for 30 s. The detection point was approximately 4 mm from the intersection. The fluorescein was detected reproducibly as a band with the expected peak shape.

Two-level mixing experiments were also performed with a similarly prepared device. The same separation medium was loaded and 4 $\mu$M fluorescein was placed in sample well 302 and 2 $\mu$M 5-(aminoacetamido)fluorescein was placed in reagent well 326. Sample injection and separation was performed with each reagent separately and with mixing of the two reagents. To inject and separate the mixture of reagents, wells 302, 326, 318 and 320 were first set to ground while well 314 was set to 900 V and maintained for 60 s to allow the reagents to enter and cross intersection 312. Then, wells 302, 326 and 314 were set to 700 V, well 320 set to 1400 V, and well 318 held at ground. Optical detection was performed at a distance of 4.5 mm downstream from intersection 312. To inject and separate either fluorescein or 5-(aminoacetamido)fluorescein separately the same procedure was followed except well 302 or 326, respectively was left floating throughout the process. This series of measurements demonstrated that continuous stable currents were established throughout the device, particularly through the vias, samples can be reliably transported from level to another in a multilevel device, and the samples can be manipulated by dilution and/or mixing.

FIG. 4 shows the composite multilevel device, a cross-sectional view and the separate level patterns for a card designed to provide four CE injection/separation elements that have a common wells for the separation buffer, the sample injection waste and the separation waste. The channels and the wells overlap in space in the different levels to provide a more compact arrangement of the fluidic elements.

Figure 4A:
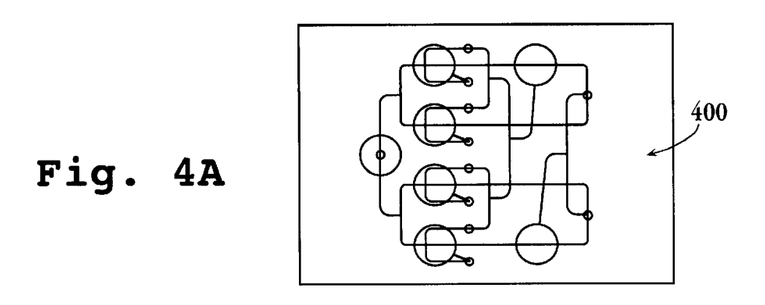
FIG. 4A is a composite diagrammatic plan view of the flow circuit of a multilevel device according to the subject invention.
Figure 4B:
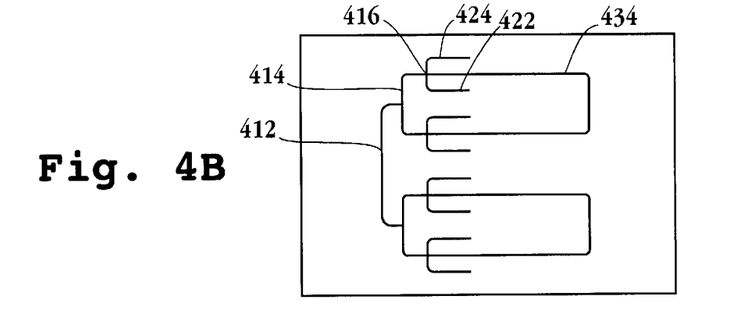
FIGS. 4B, 4C, 4D are diagrammatic plan views of the microstructures of the lower, middle and upper levels, respectively, of the device of FIG. 4A.
Figure 4C:
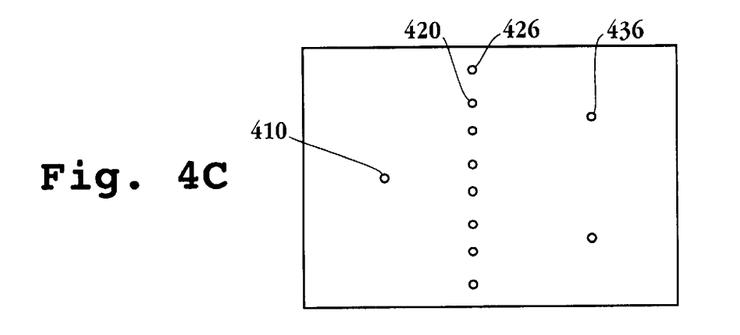
Figure 4D:
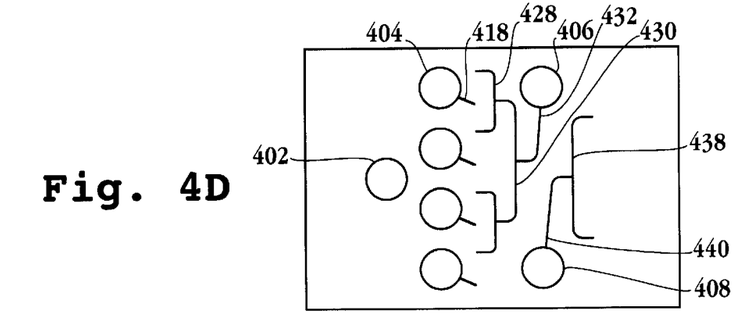

In FIG. 4A the composite design is shown, while FIGS. 4B, 4C and 4D show diagrams of the lower, middle and upper levels, respectively. The wells are shown as larger circles, the vias as smaller circles and the channels as lines, where a bold, black line indicates a channel in the upper level and gray line indicates a channel in the lower level. The device has a sample injection and separation system on one level and the wells and the manifold channel systems joining the separation elements to the common wells on the other level. The device is fabricated according to the same methods as described above.

With reference to FIGS. 4A–4D the device will be described. The device 400 again has four flow elements but one will be explicitly described, with the others being understood by analogy. Sample well 404, in the upper level, is connected by upper level channel 418 through via 420 to channel 422 in the lower level, which leads to intersection 416. From the intersection 416, an injection waste channel 424 leads through via 426 to the upper level manifold composed of secondary manifold channel 428, primary manifold channel 430, channel 432 and the injection waste reservoir 406. The separation buffer is provided from a common reservoir 402, which connects through via 410 to primary manifold 412 and secondary manifold 414 to lead to intersection 416. The main separation channel 434 leads from the intersection 416 and through via 436 to primary manifold channel 438 and channel 440 to separation waste reservoir 408.

In operation of the device, a separation buffer medium would be introduced throughout the device to fill all of the channels and wells. Sample would then be introduced into sample well 404 and electrodes inserted into the liquid in wells 402, 404, 406 and 408. By appropriate choice of voltages at the wells, sample is moved from sample well 404 through to injection intersection 416. Once the sample has been moved through the injection intersection 416, the voltages are changed and the sample at the intersection injected into channel 434 where the sample is separated and analyzed.

Because of the topological relationships of the flow elements and common reservoirs and their associated manifolds, such a device 400 cannot be made as a single level device.

Figure 5:
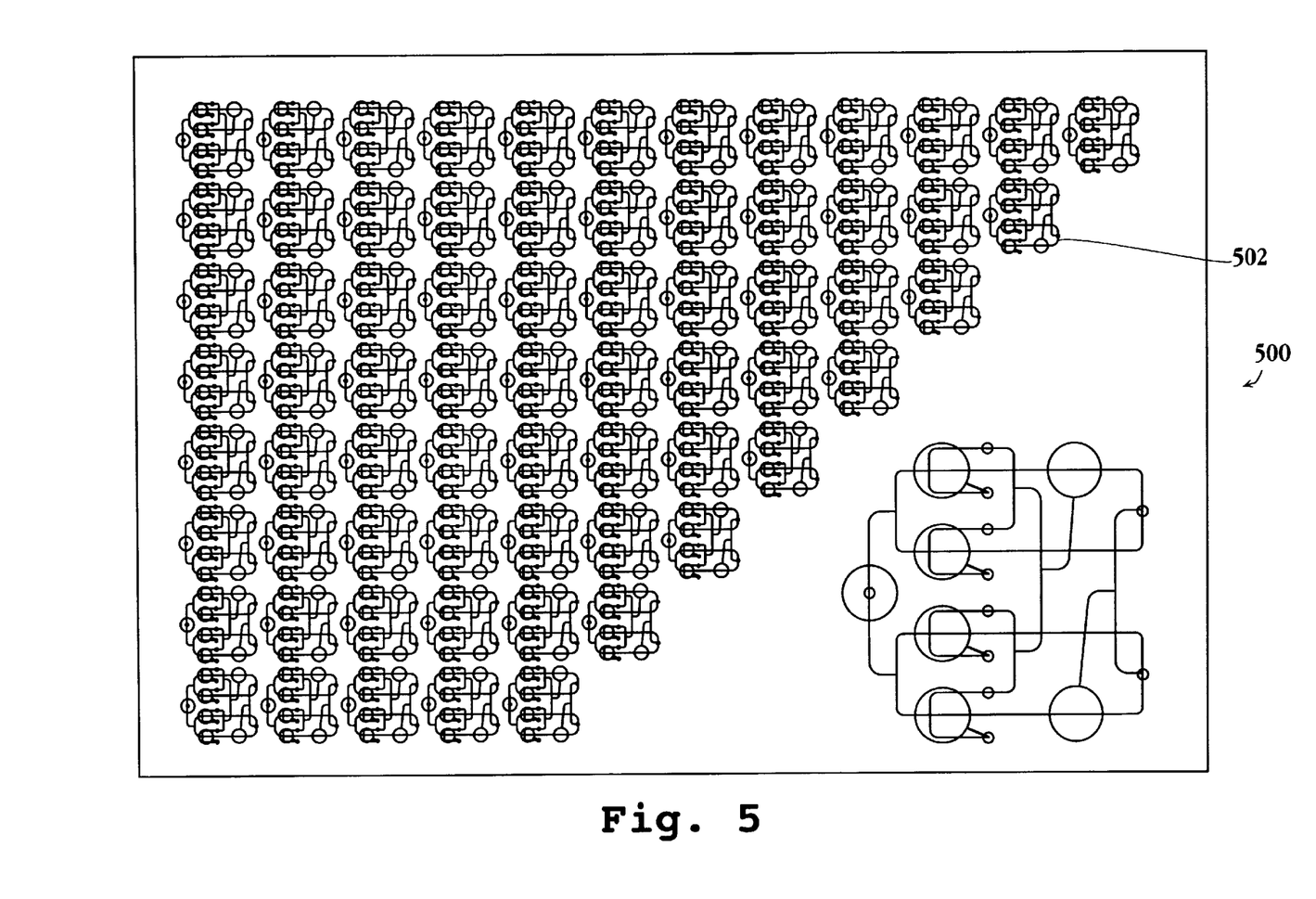
FIG. 5 shows a diagrammatic plan view of a device having an 8×12 array of multilevel fluidic network units. In the lower right portion of the array units have been omitted and an enlarged view of a single unit is shown.
Figure 6A:
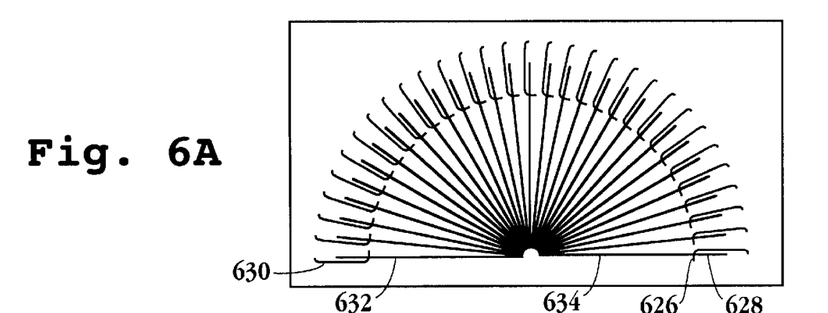
FIGS. 6A, 6B, 6C are diagrammatic plan views of the microstructures of the lower, middle and upper levels, respectively, of the device of FIG. 6D, which shows a composite diagrammatic plan view of the flow circuit of another embodiment of a multilevel device according to the subject invention.
Figure 6B:
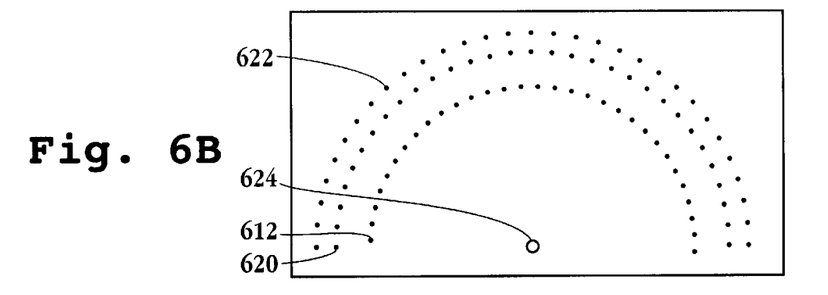
Figure 6C:
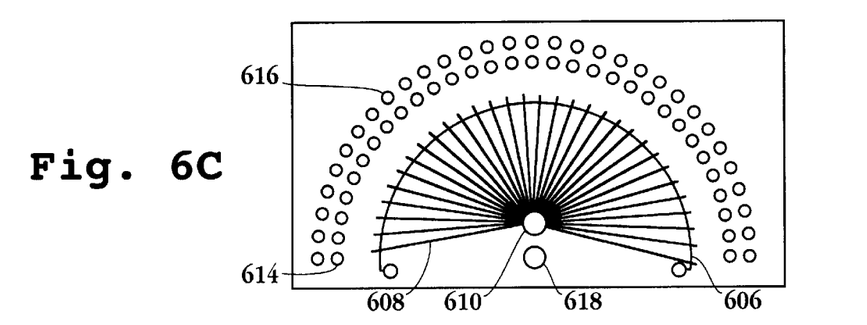
Figure 6D:
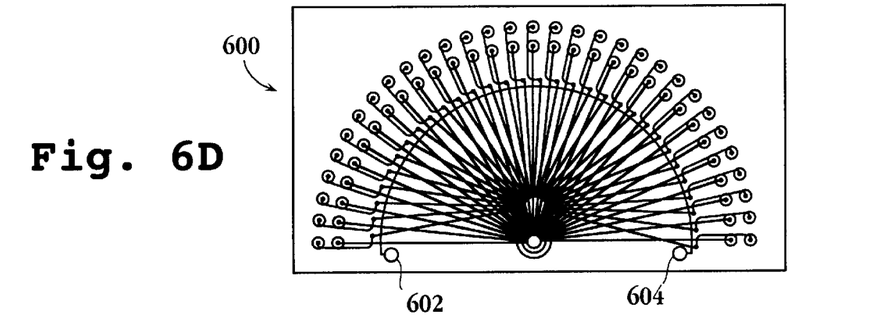
Figure 6E:
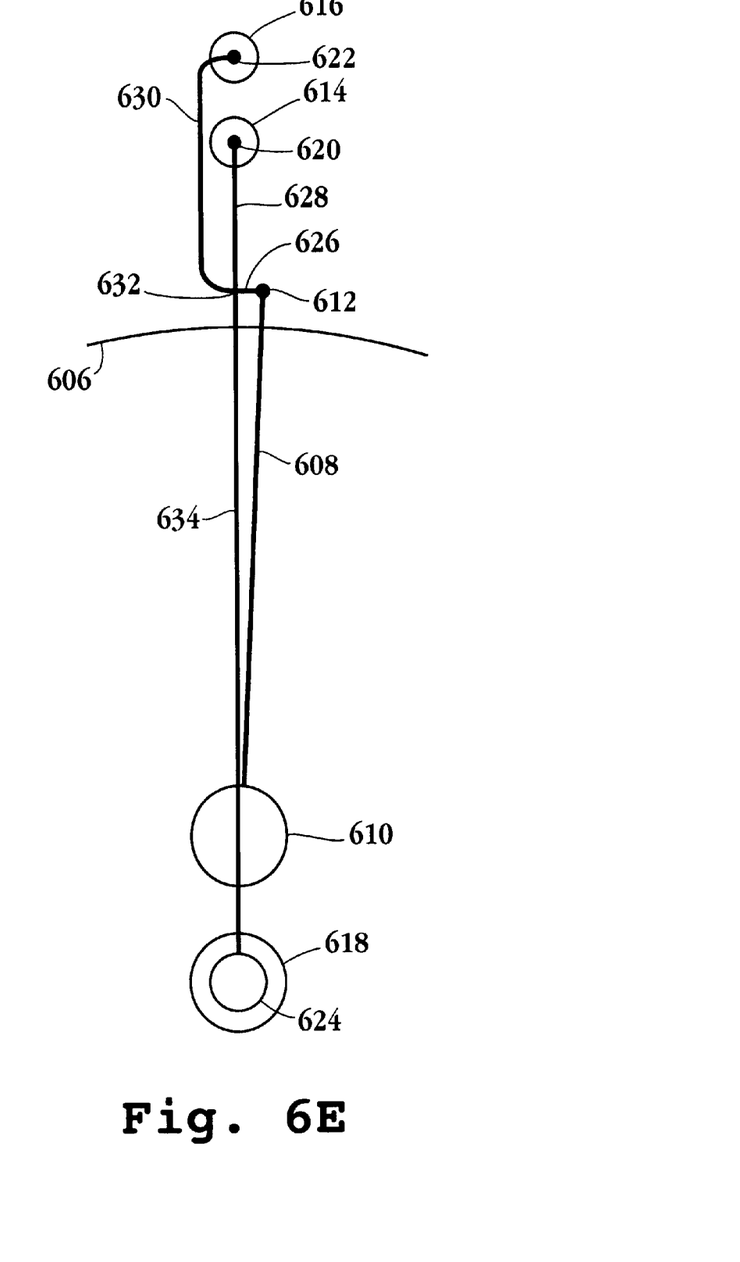
FIG. 6E shows an enlarged view of a section of the device of FIG. 6D.
Figure 7A:
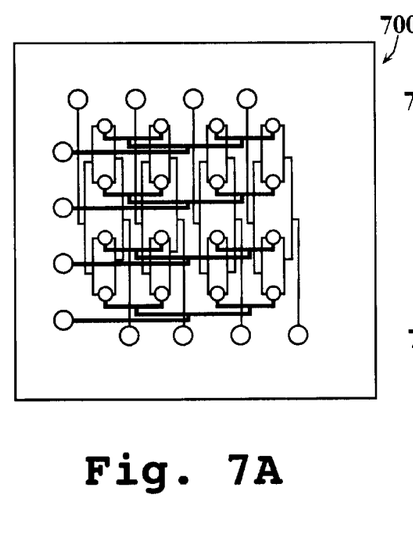
FIG. 7A shows a diagrammatic plan view of a flow circuit according to this invention having separate fluidic manifold connections by row and by column to an array of receptacles.
Figure 7B:
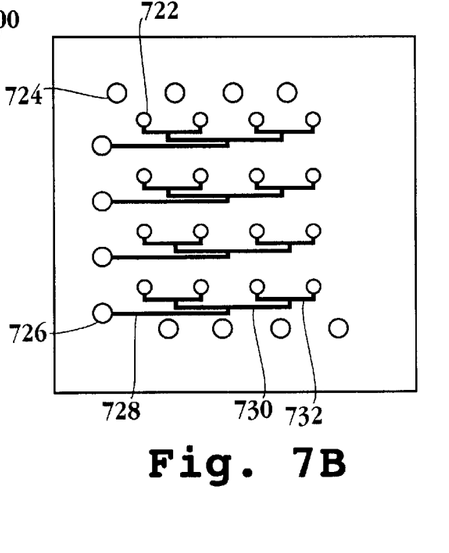
FIGS. 7B, 7C, 7D are diagrammatic plan views of the microstructures of the upper, middle and lower levels, respectively, of the device of FIG. 7A
Figure 7C:
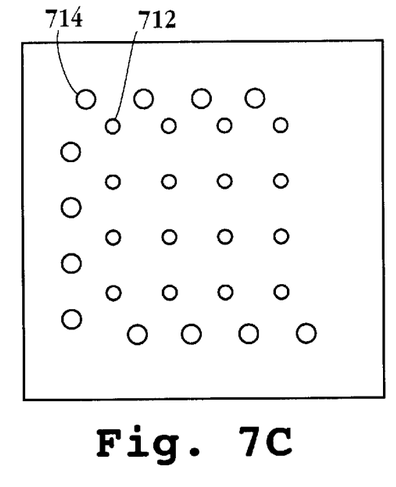
Figure 7D:
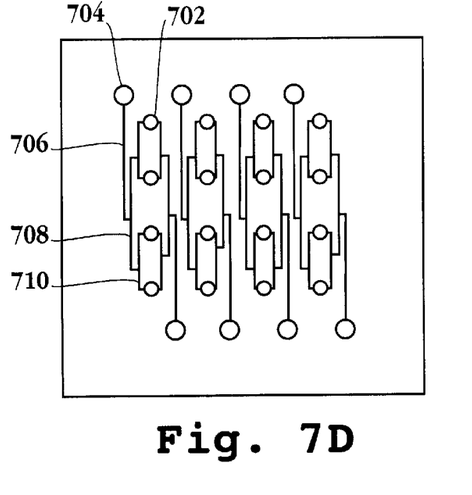

FIG. 5 shows a device 500 having an array of 96 multilevel fluidic network units 502 wherein each unit provides four CE injection/separation elements that have common wells for the separation buffer, the sample injection waste and the separation waste. The units are arranged in an 8×12 pattern. The units in the upper right portion have been omitted, with an enlargement of a single unit shown instead. The unit 502 is the same as that described in FIG. 4. The device of FIG. 5 provides for the analysis of 384 individual samples within the area of a standard microtiter plate, wherein the dimensions of the various microstructures are as follows: reservoirs, 1.5 mm diameter; vias, 0.5 mm diameters; channels, 50 $\mu$m width×100 $\mu$m depth. Based on a design rule that no features can be located closer than 0.75 mm to any other feature in the same level leads to the conclusion that a similar device cannot be constructed in a single level device.

Another embodiment of a multilevel device is shown in FIG. 6. In FIGS. 6A, 6B and 6C show diagrams of the lower, middle and upper levels, respectively, while in FIG. 6D the composite design is shown, and an enlarged view of a section of the device is shown in FIG. 6E. The wells are shown as larger circles, the vias as smaller circles and the channels as lines, where a bold, black line indicates a channel in the upper level and gray line indicates a channel in the lower level. The device has sample separation systems on two levels and the means to transfer fractions of separated materials from one system to the other. The device is fabricated according to the same methods as described above.

With reference to FIGS. 6A–6E the device will be described. In the upper level, main separation channel 606 has reservoirs at both ends, wells 602 and 604. A reagent well 610 is centrally located, with channel 608 radiating out from well 610 and crossing main separation channel 606. Channel 608 extends beyond the main channel and communicates through via 612 to lower level channel 626, which leads to intersection 632. From the intersection, channel 630 connects to injection waste reservoir 616 through via 622, and channel 628 connects to buffer reservoir 614 through via 620. The secondary separation channel 634 extends from intersection 632 under the main separation channel and reagent well, connecting to separation waste reservoir 618 through via 624.

In FIG. 7 is illustrated another aspect of the subject invention, in which receptacles or test wells are arranged in an array and each row and column of receptacles are accessible through independent channels. In FIG. 7A the composite design is shown, while FIGS. 7B, 7C and 7D show diagrams of the lower, middle and upper levels, respectively. The device will now be described in detail with reference to FIGS. 7A–7D. In the lower level is the lower portion of a 4×4 array of receptacles 702. Column reagent reservoirs 704 are connected to primary, secondary and tertiary manifold channels 706, 708 and 710, respectively, which connect to four receptacles that lie in one column of the array of receptacles. As shown in FIGS. 7A and 7B, there are two manifolds connecting to each column from opposite sides of the receptacles. One manifold per column (or row) may be sufficient, but where desired for greater flexibility in the ratio or amount of reagents or buffers added to the test wells two manifolds per column (or row) may be provided. In the middle layer are provided vias 712 and 714 that connect the array of receptacles and the column reagent reservoirs, respectively, in the lower level to reservoirs in the upper level. The upper level provides reservoirs 722 and 724 that extend the array of receptacles and the column reagent reservoirs, respectively, to the upper surface. Also provided is a set of row reagent reservoirs 726, and the primary, secondary and tertiary manifold channels 728, 730 and 732, respectively, which connect to four receptacles that lie in one row of the array of receptacles. The receptacles may be further provided with a cover, which may be gas permeable, to permit long term experiments or the use of live cells which require an appropriate balance of gases in contact with the solution.

It is evident from the above results that multilevel microfluidics having complex patterns can be employed for miniaturizing multiplexed processes. The subject devices permit the use of common sources of samples and/or reagents to be processed and/or analyzed in individual flow systems. In this way multiple results can be obtained simultaneously in a single device having a small footprint and a high density of flow systems. By employing common reservoirs for samples and/or reagents, where the reservoirs may be in one level or extend over a plurality of levels, economies in the use of the sample and reagents are achieved. Sample handling is simplified, since a single transfer to a single reservoir will suffice for performing a plurality of tests on a sample. Similarly, one need transfer a reagent to one well for a plurality of tests. In addition, because the particular operation component will be distributed into a multiplicity of operations, larger volumes are mechanically transferred, permitting simpler equipment, requiring less stringency in the measurement and metering of the component and easier manipulation. In addition, since the component is obtained from a single well, one need not be concerned about differences in the sample for each of the flow systems, since the flow systems will have a common source.

The devices are produced whereby each of the levels is insulated from the other levels except at sites where communication is desired. Various patterns are available, where one has a plurality of manifolds at each level to allow for common distribution of a sample or reagent to a plurality of receivers, so that each manifold can be used as a supply of a different material. Other patterns provide for communication between levels, whereby complex operations are performed by moving components between layers to interact in complex ways allowing for chemical reactions, analysis, etc.

All publications, patents and patent applications mentioned in this specification are herein incorporated by reference to the same extent as if each individual publication, patent, or patent application was specifically and individually indicated to be incorporated by reference.

The invention now being fully described, it will be apparent to one of ordinary skill in the art that many changes and modifications can be made thereto without departing from the spirit or scope of the appended claims.

It is claimed:

1. A microfluidics device comprising first and second laminae, each having confronting inner surfaces at which the two laminae are bonded together, and opposite outer surfaces, a first channel microstructure having a channel formed in the first lamina adjacent the first-lamina inner surface, and one or more reservoirs in fluid communication with the first-lamina channel, a second channel microstructure having a channel formed in the second lamina adjacent the second-lamina inner surface, said first-lamina and second-lamina channels being enclosed by non-channel regions of the inner surfaces of the second and first laminae, respectively, and being in communication through a via formed where a region of the first-lamina channel overlaps a region of the second-lamina channel, and one or more openings formed in at least one lamina, communicating the outer surface of said at least one lamina with one or more reservoirs in the device, wherein liquid or liquid components contained in the first-lamina channel microstructure may be directed into the second-lamina channel microstructure through said via.

2. The device of claim 1, wherein the second-lamina channel microstructure also includes one or more reservoirs communicating with the second-lamina channel.

3. The device of claim 2, wherein one or more of said openings communicate with the outer surface of said at least one surface with reservoirs in both the first-lamina and second-lamina channel microstructures.

4. The device of claim 1, wherein one or more of said reservoirs is adapted to receive an electrode in contact with liquid contained in said one or more reservoirs, such that application of a voltage potential across selected electrodes is effective to move an electrolyte solution or charged components in a solution within the channel microstructures in each lamina and between the first-lamina and second-lamina microstructures.

5. The device of claim 1, wherein said first-lamina microstructure includes a sample-holding well and a sample channel in communication therewith, said second-lamina includes intersecting side and separation channels, and a sample-loading region in the separation channel where the two channels intersect, and the sample channel in the first lamina has a region of overlap with the side channel in the second lamina, such that solution or solution components in the sample well can be moved into the sample-loading region through said via, and separation of charged sample components in the sample-loading zone can be achieved by applying a potential difference across reservoirs communicating with opposite ends of the separation channel.

6. The device of claim 1, wherein (i) said first-lamina microstructure includes a first separation channel communicating at opposite ends thereof with first-separation channel reservoirs, (ii) said second-lamina microstructure includes a second separation channel communicating at opposite ends thereof with second-separation channel reservoirs, and (iii) said first and second separation channels communicate through a via which allows sample material separated by movement along the first separation channel to be loaded into the second separation channel, for further separation therein.

7. The device of claim 6, wherein the second-lamina microstructure includes a plurality of second separation channels, each communicating with one of a plurality of vias that communicate with the first separation channel at spaced intervals along the length thereof, allowing a plurality of sample components separated in the first separation channel to be further separated by movement along each of the plurality of second separation channels.

8. The device of claim 1, wherein (i) said first-lamina microstructure includes a first separation channel communicating at opposite ends thereof with first-separation channel reservoirs, (ii) said second-lamina microstructure includes a plurality of sample-processing stations at which sample-processing steps can occur, each station communicating with one of a plurality of vias that communicate with the first separation channel at spaced intervals along the length thereof, allowing a plurality of sample components separated in the first separation channel to be further processed by movement into a selected processing station.

* * * * *